United States Patent [19]

Giller et al.

[11] 4,167,540

[45] Sep. 11, 1979

[54] METHOD OF IMPROVING THE TACKINESS OF RUBBER COMPOSITIONS WITH MODIFIED ALKYLPHENOL NOVOLAK

[75] Inventors: Arnold Giller, Tanusstein; Wolfgang Hesse, Breckenheim, both of Fed. Rep. of Germany

[73] Assignee: Hoechst Aktiengesellschaft, Frankfurt am Main, Fed. Rep. of Germany

[21] Appl. No.: 710,548

[22] Filed: Aug. 2, 1976

[30] Foreign Application Priority Data

Aug. 23, 1975 [DE] Fed. Rep. of Germany ....... 2537656

[51] Int. Cl.² .......................... C08L 9/00; C08L 61/00
[52] U.S. Cl. ...................................... 525/135; 260/3; 525/145
[58] Field of Search .................................. 260/845, 3

[56] References Cited

U.S. PATENT DOCUMENTS

| | | | |
|---|---|---|---|
| 3,294,866 | 12/1966 | Soldatos | 260/845 |
| 3,674,723 | 7/1972 | Vredenburgh et al. | 260/845 |
| 4,007,233 | 2/1977 | Kako et al. | 260/845 |
| 4,020,048 | 4/1977 | Harrop | 260/845 |

FOREIGN PATENT DOCUMENTS 1428285 3/1976 United Kingdom .

*Primary Examiner*—Harold D. Anderson
*Attorney, Agent, or Firm*—Hammond & Littell

[57] ABSTRACT

A rubber composition having improved tackiness and comprising a natural or synthetic rubber and as a tackifier from 0.3 to 15% by weight (referred to the rubber) of a modified alkylphenol novolak prepared from
  (A) a phenol component selected from the group consisting of
    (i) a monoalkylphenol having from 3 to 18 carbon atoms in the alkyl group, and
    (ii) a mixture of (i) with up to 30 mol% of a dialkylphenol having a total of from 6 to 24 carbon atoms in the alkyl groups with
  (B) a substance which is at least trifunctional with respect to formaldehyde and
  (C) formaldehyde
wherein the molar ratio of one of components (i) and (ii): (B) is from 70:30 to 99:1, a method for its preparation and a molded article prepared therefrom.

5 Claims, No Drawings

METHOD OF IMPROVING THE TACKINESS OF RUBBER COMPOSITIONS WITH MODIFIED ALKYLPHENOL NOVOLAK

This invention relates to a method of improving the tackiness of rubber compositions used in the preparation of moulded articles, particularly vehicle tires.

Rubber articles are frequently made up of several layers each with the same or a different chemical basis. For ease of production the layers must adhere to one another adequately in the non-vulcanised state. This is particularly true of the manufacture of vehicle tires, wherein the layers have to adhere to one another quickly and firmly when the tyre blanks are built up. The assembled tire blank itself is required to hold together for a fairly long period and it is therefore important that the rubber mixtures used have an adequate tackiness. This property is termed "assembly tackiness" or "building tack."

Hitherto, nobody has succeeded in finding a generally valid definition for term "building tack." This, in commercial practice, tackiness is often taken to mean the flowing together to two surfaces. However, this effect depends substantially on the softness of the mixtures. Hereinafter, the term "tackiness" is taken to mean the force which is required to pull apart two non-vulcanised mixtures which have been pressed together under certain defined conditions.

Experience has shown that while natural rubber mixtures have good tacky qualities, mixtures of synthetic rubbers are much less tacky and, in extreme cases, are not tacky at all. Therefore, it has been common practice to add a tackifier to the less tacky mixtures to increase the package tackiness. Known tackifiers are colophony, hydrogenated and dimerised colophony, terpene resins and modified terpene resins, hydrocarbon resins based on unsaturated $C_5$ hydrocarbons, unsaturated $C_9$ hydrocarbons, dicyclopentadiene or coumarone, phenol resins of the novolak type, for example those obtained from alkylphenols having from 4 to 15 carbon atoms in the alkyl groups by reaction with formaldehyde in an acid medium, and alkylphenol resins prepared by reacting alkylphenols with alkynes, particularly acetylene.

It has been proposed to use as a tackifier for rubber compositions, a phenol-crotonaldehyde novolak, the phenol component of which comprises, for example, an alkylphenol and/or a diphenol, e.g resorcinol or hydroquinone. The crotonaldehyde may optionally be replaced by up to 50% formaldehyde. These resins have the disadvantage however that pollution of the atmosphere occurs when they are produced owing to the smell of the crotonaldehyde. Crotonaldehyde resins of this kind have not hitherto found practical application.

The rubber compositions into which the tackifier is incorporated are generally produced in internal mixers or on sets of rollers from a natural or synthetic rubber, e.g. styrene-butadiene copolymers, polybutadiene and mixtures thereof, fillers, processing agents and vulcanising agents. They must remain sufficiently tacky under the operation conditions, even when operation is interrupted for fairly long periods. With the known tackifiers, this is not always achieved or is only partly achieved. Moreover, the known tackifiers often do not achieve an adequate increase in tackiness.

According to the present invention there is now provided a method of improving the tackiness of a rubber composition which comprises admixing therewith from 0.3 to 15%, preferably from 1 to 5% by weight (referred to the rubber) of a modified alkylphenol novolak prepared from (A) a phenol component comprising
 (i) a monoalkylphenol having from 3 to 18 carbon atoms in the alkyl group or
 (ii) a mixture of (i) with up to 30 mol % of a dialkylphenol having a total of from 6 to 24 carbon atoms in the alkyl groups and
(B) a substance which is at least trifunctional with respect to formaldehyde and
(C) formaldehyde wherein the molar ratio of components (i) or (ii): (B) is from 70:30 to 99:1, preferably from 80:20 to 98:2.

The modified alkylphenol novolaks used in the new method according to the invention are advantageously prepared by condensation of the phenol component (A), the at least trifunctional component (B) and formaldehyde (C) in the presence of a acid catalyst. The molar equivalent ratio of the components (A) and (B) to the formaldehyde (C) in the novolak prepared is generally in the range from 1:1.1 to 1:0.8, preferably from 1:1.05 to 1:0.9.

The mono- and dialkyl phenols used as components (i) and (ii) respectively are preferably ortho-and/or para-substituted. Suitable alkyl groups include for example propyl, isopropyl, sec. butyl, n-butyl, tert. butyl, isobutyl, n-hexyl, octyl, isooctyl, nonyl, isononyl, dodecyl and isododecyl groups as well as higher alkyl groups and cycloalkyl groups, e.g. cyclohexyl groups.

Suitable polyfunctional substances (B) include for example phenolic compounds, aminoplast forming agents, polyamides and etherified and unetherified methylol compounds. Suitable phenols include for example phenol, m-cresol, 3,5-dimethylphenol, pyrocatechol, hydroquinone and resorcinol, polynuclear phenols, e.g. diphenylolpropane and diphenylolmethane, and low molecular weight novolaks prepared from the above mentioned phenols and formaldehyde.

Aminoplast forming agents having a total of at least six carbon and nitrogen atoms are preferred, e.g. melamine and formoguanamine and substitution products thereof such as acetoguanamine and benzoguanamine, and dicyanodiamide. Other substances which may be used as component (B) are for example polymeric amides of acrylic and methacrylic acid and functional derivatives thereof, e.g. etherified methylol derivatives thereof, polyamides from polyamines and polycarboxylic acids or aminocarboxylic acids, for example the condensation products of hexamethylene diamine and adipic acid and the condensation products of dimerised fatty acids and aliphatic diamines such as ethylene diamine or diethylene triamine, and also polycaprolactam.

Methylol derivatives of the at least trifunctional substances mentioned above, the methylol group of which may optionally be etherified with alcohols, may also be used as component (B). The use of etherified methylol compounds is advisable when the polyfunctional compounds themselves are not sufficiently soluble in the reaction mixture. This is true particularly of melamine and dicyanodiamide and their derivatives.

The novolak resins are preferably prepared by simultaneously reacting together components (i) or (ii), (B) and the formaldehyde, which may be used as an aqueous solution and/or as a polymer, e.g. the trimer at a temperature in the range from 80° to 300° C. However, it is also possible to react component (i) or (ii) with the formaldehyde in a first stage at a temperature of from 80° to 130° C. until the majority of the formaldehyde is used up, then to add component (B) and continue the reaction at a temperature of from 80° to 300° C. Afterwards in both cases the reaction product should be free of volatile components by distillation.

Acids and acid anhydrides may be used as catalysts for the condensation. The following may thus for example be used; inorganic acids e.g. hydrochloric, sulphuric, phosphoric and phosphorous acids; carboxylic acids e.g. oxalic, maleic, fumaric, chloroacetic and trichloroacetic acids; sulphonic acids, e.g. benzenemono-, di- and trisulphonic acids, toluene sulphonic acids and alkane sulphonic acids; acid esters of phosphoric acid, e.g. diphenylphosphoric and monophenylphosphoric acids; and acid anhydrides, e.g. maleic anhydride, pyromellitic anhydride and trimellitic anhydride.

After condensation and removal of the volatile components, the modified alkylphenol resins obtained are generally light yellow to brown solid resins. They generally have melting points in the range from 40° to 160° C. and are totally or to a far extent soluble in aromatic solvents.

The rubber composition to which the tackifier is added may comprise a natural or synthetic rubber or a mixture thereof, for example a styrene-butadiene copolymer rubber or an ethylene-propylene-diene terpolymer rubber.

In the method according to the invention the novolak is advantageously added to the rubber composition and is homogenised therewith at a temperature above the melting point of the novolak. The homogenisation is conveniently effected in a roller mill at a mixture surface temperature in the range from 100° to 120° C. One or more further ingredients selected from stearic acid, zinc oxide, processing adjuvants, anti-agers, vulcanising agents e.g. phenolic resins and especially sulphur, fillers and mineral oil may if desired be added to the mixture at this stage. After homogenisation an accelerator is generally added to the composition at a temperature below the activation temperature of the accelerator, e.g. at temperatures of up to 120° C.

The "heat treatment" described here which brings about homogenisation is known per se. The effect of the novolak is particularly good when it is completely dissolved in the rubber phase and is not present in the mixture in the form of solid particles. This can virtually always be achieved by means of the "heat treatment" described. As an alternative the resin can be admixed with the rubber composition and heated in any desired manner to the temperature required for melting of the resin thereby dissolving the resin in the rubber at any stage of the mixing process.

The following Examples illustrate the method according to the invention. In the Examples P indicates parts by weight.

EXAMPLES

Preparation of the rubber composition 300 grams of rubber or a corresponding amount of a carbon black-rubber mixture (e.g. 450 grams of a mixture of styrene-butadiene rubber and HAF carbon black containing 50 grams of HAF carbon black to 100 grams of styrene-butadiene rubber) are first applied to a set of rollers, the rollers of which are 150 mm in diameter and 350 mm long. When a sealed sheet has formed, further ingredients selected from stearic acid, zinc oxide, processing adjuvants, anti-agers, vulcanising agents, e.g. a phenol resin or sulphur, filler and mineral oil, and the modified alkylphenol novolak resin which improves the tackiness are mixed in one after the other. The mixtures are then rolled for five minutes at temperatures of from 100° to 120° C. (measured on the surface of the mixtures running on the rollers). The temperature must be significantly higher than the melting point of the resin used and may accordingly be increased even to above 120° C. Mixing is subsequently completed by adding an accelerator at conventional mixing temperatures, i.e. at temperatures at which the accelerator does not react, e.g. at temperatures of up to 120° C.

Compositions of formulae 1 to 4 as shown in Table 1 are produced using tackifier resins A to D prepared as described hereinafter.

TABLE 1

| Formula (in P) | 1 | 2 | 3 | 4 |
|---|---|---|---|---|
| Natural rubber | 100 | — | 30 | — |
| Styrene-butadiene rubber | — | 100* | — | — |
| HAF carbon black | 45 | 50* | 45 | 50 |
| Polybutadiene | — | — | 70 | — |
| Ethylene-propylene-diene rubber** | — | — | — | 100 |
| Stearic acid | 2 | 1 | 2 | 1 |
| ZnO | 3 | 5 | 4 | 5 |
| Paraffin | 0.5 | — | — | — |
| Anti-ager | 1.5 | 1 | — | — |
| Sulphur | 2.5 | 2 | 1.6 | 1.5 |
| Mineral oil | 3 | — | 3 | 40 |
| Tackifier resin | 4 | 4 | 4 | 4 |
| Benzothiazyl-2-cyclohexyl-sulphenamide | 0.6 | 1 | 0.8 | — |
| Zinc-N-diethyldithio-carbamate | — | — | — | 2 |
| Tetramethylthiuramdisulphide | — | — | — | 0.5 |
| Mercaptobenzothiazole | — | — | — | 0.5 |

*As a preliminary mixture
**"Sequency type" with ethylidene norbornene as diene Mooney Viscosity at 100° C. (1 + 4 min) : 30

Preparation of the tackifier resins

Resin A 594 g of isononylphenol, 69 g of 91% aqueous formaldehyde and 2 g of toluenesulphonic acid are refluxed at 100° to 110° C. for 3 hours. Subsequently, 73.3 g of hexamethoxymethylmelamine are added. The volatile components are then distilled off from the mixture until the product is at a temperature of 220° C. When distillation has ceased, the temperature is kept at 230° C. for 1 hour under a water-jet pump vacuum. 660 g of a light-coloured resin are obtained, melting point 94° C.; viscosity 125cP/20° C. (in 50% xylene solution).

Resin B 627 g of nonylphenol, 100 g of 91% aqueous formaldehyde and 2 g of p-toluenesulphonic acid are refluxed at 100° to 110° C. for 7 hours. Subsequently, an aqueous solution of 8.3 g of resorcinol in 20 g of water is added. The temperature is then increased to 220° C. and the volatile components are distilled off from the mixture. When distillation has ceased, the temperature is kept at 230° C. for one hour under a water-jet pump vacuum. 640 g of a light brown resin are obtained; melting point 87° C.; viscosity 70cP/20° C. (in 50% xylene solution).

Resin C

The preparation is analogous to Example 2 but, instead of 8.3 g of resorcinol, 16.5 g of resorcinol in 25 g of water are added. 650 g of a light brown resin are obtained; melting point 103° C.; viscosity 195cP/20° C. (in 50% xylene solution).

Resin D 627 g of nonylphenol, 16.5 g of commercial grade m-cresol (m-cresol content 55%), 100 g of 91% aqueous paraformaldehyde and 13.2 g of maleic anhydride are refluxed for 12 hours. The formaldehyde content is then 0.5%. The process is then continued as described in Example 2. 650 g of resin are obtained; melting point 68° C.; viscosity 45cP/20° C. (in 50% xylene solution).

The performance of the modified alkylphenol novolak resins produced in comparison with standard commercial tackifier resins and with no tackifier at all was tested as follows:

A polyethylene film is first placed on a chromium plated metal sheet and a frame with internal measurements 110×110×2 mm is then placed over it. A film of polytetrafluoroethylene (PTFE) cleaned in trichloroethylene having longitudinal cuts therein and measuring 40×110 mm is placed against an inner edge of the frame. The remaining area of 70×110 mm is covered with a piece of cotton fabric. The rubber composition to be tested is then rolled out to form a sheet 2 mm thick the dimensions of which are such that it fills the entire frame. The narrow upwardly facing surface of the composition as well as a piece of cotton fabric of the same size are thinly coated with an adhesive solution [obtained from 100 T of polychloroprene, 5 T of MgO, 4 T of ZnO, 124 T of petroleum ether (boiling range 80° to 110° C.), 124 T of toluene, 124 T of ethyl acetate and 45 T of an alkylphenol novolak]. After 15 minutes drying time, the cotton fabric is placed with the coated side against the upper surface of the rubber composition and covered with a polyethylene film and a second chromium plated metal sheet. The assembly is compressed in a vulcanising press at room temperature or at the temperature specified hereinafter for five minutes to form an assembly of 2 mm thickness. This is then carefully removed from the frame in such a way that the PTFE film does not lift off.

Strips 22.5 mm wide are cut off and, after removal of the PTFE film, pairs of strips are placed in a converted Shore hardness measuring apparatus provided with a square stamp with sides measuring 2 cm. The pairs of strips are compressed under a load totalling 10 kg for 90 seconds.

To test each resin, several tests were carried out on 22.5 cm wide strips using the following test conditions:

Test 1

Removal of the PTFE film. Pressing two strips together for 90 seconds and then pulling them apart again immediately.

Test 2

Removal of the PTFE film. Storage of strips with an exposed test surface for 24 hours at room temperature. Pressing two strips together and subsequently pulling them apart again.

Test 3

Removal of the PTFE film. Storage of the strips with an exposed test surface for 30 minutes at 80° C. The cooling for 30 minutes. Pressing two strips together for 90 seconds and subsequently pulling them apart again.

Test 4

Removal of the PTFE film. Storage of strips with an exposed test surface for 30 minutes at 80° C. Then storage at room temperature for 24 hours. Pressing two strips together for 90 seconds and then pulling them apart again.

Test 5

Removal of the PTFE film. Storage of the strips with an exposed test surface for 30 minutes at 80° C. Pressing two strips together whilst warm. Pulling strips apart again after cooling.

Test 6

Removal of the PTFE film. Irradiation of the strips with UV light for two or five seconds. Pressing two strips together for 90 seconds and subsequently pulling them apart again.

The results for resins A to C in compositions of formulae 1, 2 and 4 are given in Tables 2–4. Corresponding values for resin-free compositions and for compositions containing standard commercial tackifiers based on octylphenol novolak, terpene phenol resin and the reaction product of p-tert.butyl phenol and acetylene are also given for comparison purposes. The values given in Tables 2 to 4 show the force in N/4 cm² (N=Newton) required to pull apart two sample strips which have been pressed together. In order to show the differences in performance between the different resins, the results of the individual tests are added together in the Tables.

TABLE 2

Tackifying activity of resin A to C in compositions according to formula 1

| | State of the art | | | | According to the invention | | |
|---|---|---|---|---|---|---|---|
| Tackifier resin | without resin | Octylphenol novolak | Terpene phenol resin | resin from p-tert. butyl phenol + acetylene | Resin A | Resin B | Resin C |
| | Adhesive power in N/4 cm² | | | | | | |
| Test 1 | 68 | 75 | 81 | 59 | 84 | 88 | 69 |
| 2 | 40 | 81 | 75 | 75 | 82 | 87 | 90 |
| 3 | 90 | 83 | 63 | 58 | 79 | 105 | 98 |
| 4 | 65 | 69 | 79 | 66 | 86 | 80 | 110 |
| 5 | 94 | 88 | 69 | 71 | 114 | 119 | 98 |
| 6 | 34 | 73 | 69 | 65 | 106 | 87 | 47 |
| Total 1–6 | 391 | 469 | 463 | 394 | 551 | 566 | 512 |

Compared with the mixture without resin, the known standard commercial resins cause only a limited increase in the building tack. This is due to the inherent natural tackiness of natural rubber which is already very high and heretofore did not appear to be capable of being increased very much. However resins A to C cause a considerable increase in package tackiness. Compared with the composition without resin, the increase is up to 45%.

The increase in tackiness naturally varies according to the individual Test 1 to 6 used. Particularly good results are obtained with the resins A to C if the samples are heated to 80° C. for 30 minutes immediately before being pressed together (Test 5). Equally significant increases are obtained with the resins A to C in Test 4. In general the tackiness is significantly increased by heating the composition prior to sticking the samples together.

Moreover, the results according to Test 2 show that the tackifying effect of the resins A to C used according to the invention is not affected when compositions according to formula I are stored with their surfaces exposed, i.e. unprotected, and in many cases tackiness is even increased compared with a freshly produced test surface (Test 1).

TABLE 3

Tackifying activity of resins A to C in compositions according to formula 2

| Tackifier | State of the art | | According to the invention | | |
|---|---|---|---|---|---|
| | without resin | Resin from p-tert butylphenol and acetylene | Resin A | Resin B | Resin C |
| Test 1 | 23 | 33 | 34 | 34 | 37 |
| 2 | 3 | 36 | 42 | 40 | 42 |
| 3 | 2 | 27 | 29 | 32 | 38 |
| 4 | 7 | 38 | 42 | 40 | 40 |
| 5 | 44 | 44 | 54 | 77 | 52 |
| 6 | 17 | 28 | 39 | 30 | 30 |
| Total 1-6 | 96 | 206 | 240 | 253 | 239 |

For comparison purposes, a corresponding composition without resin and a composition containing a standard commercial resin obtained by reacting a p-tert butylphenol with acetylene were also tested.

The comparison mixture without resin has very low tackiness. The known standard commercial tackifier resin which is obtained by reacting p-tert butylphenol with acetylene causes a considerable increase in tackiness. However the resins A to C used according to the invention cause an even greater increase which is significant in Tests 2, 3, 4 and 6 and is very marked in Test 5.

TABLE 4

Tackifying activity of resin A in compositions according to formula 4

| | State of the art | | Invention |
|---|---|---|---|
| Test | without resin | resin from p-tert butylphenol and acetylene | Resin A |
| 3 | 67 | 77 | 102 |
| 4 | 119 | 125 | 156 |
| Total 3 + 4 | 186 | 202 | 258 |

EPDM rubber of the "sequence type" yields compositions having particularly poor tacky properties. Test values ranging from usable to very good are however obtained with such compositions if they are preheated for some time before being pressed together. The optimum preheating conditions have to be determined for each different case by trial and error. In general, the conditions given for Tests 3 and 4 above have proved effective.

Table 4 clearly shows that a substantial increase in tackiness is obtained by incorporation of resin A and the increase is much greater than that obtained with compositions without resin or with the resin from p-tert butylphenol and acetylene.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A method of improving the tackiness of a styrene-butadiene copolymer rubber composition which comprises admixing therewith from 0.3 to 15% by weight, referred to the rubber, of a modified alkylphenol novolak prepared from
   (A) a phenol component selected from the group consisting of
      (i) a monoalkylphenol having from 3 to 18 carbon atoms in the alkyl group, and
      (ii) a mixture of (i) with up to 30 mol% of a dialkylphenol having a total of from 6 to 24 carbon atoms in the alkyl groups with
   (B) a phenolic substance selected from the group consisting of phenol, m-cresol, 3,5-dimethylphenol, pyrocatechol, hydroquinone, resorcinol, diphenylolpropane, diphenylolmethane and low molecular weight novolaks, prepared from the mentioned phenols and formaldehyde which is at least trifunctional with respect to formaldehyde and
   (C) formaldehyde
wherein the molar ratio of one of components (i) and (ii): (B) is from 70:30 to 99:1.

2. A method as claimed in claim 1 wherein the molar equivalent ratio of the components (A) and (B) to formaldehyde (C) in the modified alkylphenol novolak is from 1:1.1 to 1:0.8.

3. A method as claimed in claim 1 wherein the novolak has a melting point in the range 40° to 160° C.

4. A method as claimed in claim 1 wherein the mixture of rubber composition and novolak is homogenised at a temperature above the melting point of the novolak.

5. A rubber composition consisting essentially of a styrene-butadiene copolymer rubber and as a tackifier from 0.3 to 15% by weight (referred to the rubber) of a modified alkylphenol novolak prepared from
   (A) a phenol component selected from the group consisting of
      (i) a monoalkylphenol having from 3 to 18 carbon atoms in the alkyl group,
      (ii) a mixture of (i) with up to 30 mol% of a dialkylphenol having a total of from 6 to 24 carbon atoms in the alkyl groups and
   (B) a phenolic substance selected from the group consisting of phenol, m-cresol, 3,5-dimethylphenol, pyrocatechol, hydroquinone, resorcinol, diphenylolpropane, diphenylolmethane and low molecular weight novolaks, prepared from the mentioned phenols and formaldehyde which is at least trifunctional with respect to formaldehyde and
   (C) formaldehyde
wherein the molar ratio of one of components (i) and (ii): (B) is from 70:30 to 99:1.

* * * * *